United States Patent
Bugajski et al.

(10) Patent No.: US 10,048,831 B2
(45) Date of Patent: Aug. 14, 2018

(54) CONSOLIDATED MANAGEMENT OF HOME NETWORK ELEMENTS

(71) Applicant: ARRIS Enterprises, Inc., Suwanee, GA (US)

(72) Inventors: Marek Bugajski, Norcross, GA (US); Marcin Morgos, Warsaw (PL)

(73) Assignee: ARRIS Enterprises LLC, Suwanee, GA (US)

( * ) Notice: Subject to any disclaimer, the term of this patent is extended or adjusted under 35 U.S.C. 154(b) by 194 days.

(21) Appl. No.: 15/012,207

(22) Filed: Feb. 1, 2016

(65) Prior Publication Data

US 2016/0224208 A1    Aug. 4, 2016

Related U.S. Application Data

(60) Provisional application No. 62/110,092, filed on Jan. 30, 2015.

(51) Int. Cl.
    *G06F 15/177*    (2006.01)
    *G06F 3/0481*    (2013.01)
    *G06F 3/0484*    (2013.01)
    *G06F 3/0482*    (2013.01)
    *H04L 12/24*     (2006.01)
    (Continued)

(52) U.S. Cl.
    CPC ........ *G06F 3/04817* (2013.01); *G06F 3/0482* (2013.01); *G06F 3/04842* (2013.01); *G06F 3/04845* (2013.01); *H04L 41/22* (2013.01); *H04N 21/4131* (2013.01); *H04N 21/43615* (2013.01); *H04L 12/2803* (2013.01)

(58) Field of Classification Search
    CPC ............. G06F 3/04817; G06F 3/04845; G06F 3/04842; G06F 3/0482; H04N 21/43615; H04N 21/4131; H04L 41/22; H04L 12/2803
    See application file for complete search history.

(56) References Cited

U.S. PATENT DOCUMENTS

2002/0165934 A1    11/2002    Conrad et al.
2007/0280165 A1    12/2007    Doshi et al.
(Continued)

OTHER PUBLICATIONS

PCT Search Report & Written Opinion, Re: Application No. PCT/US2016/015966, dated May 20, 2016.

*Primary Examiner* — Jeffrey A Gaffin
*Assistant Examiner* — Ayesha Huertas Torres
(74) *Attorney, Agent, or Firm* — Bart A. Perkins

(57) ABSTRACT

Methods, systems, and computer readable media can be operable to facilitate the generation of a user interface displaying the devices associated with a local network. A client device may retrieve information associated with one or more devices associated with a common central device, local network, and/or subscriber. The client device may generate a user interface including one or more device objects organized along an ellipsoidal wireframe, wherein each device object represents an identified device. The user interface may include device identification and/or status information associated with each displayed device. Devices displayed within the user interface may be filtered based upon one or more parameters selected by a user. The client device may update and rearrange the displayed device objects based upon navigation commands received from a user via a control device.

17 Claims, 8 Drawing Sheets

(51) Int. Cl.
*H04N 21/41* (2011.01)
*H04N 21/436* (2011.01)
*H04L 12/28* (2006.01)

(56) References Cited

U.S. PATENT DOCUMENTS

| | | | | |
|---|---|---|---|---|
| 2010/0110932 | A1* | 5/2010 | Doran | H04L 41/12 370/254 |
| 2011/0205162 | A1* | 8/2011 | Waller | B60K 35/00 345/173 |
| 2012/0320789 | A1 | 12/2012 | Wu et al. | |

* cited by examiner

CONSOLIDATED MANAGEMENT OF HOME NETWORK ELEMENTS

CROSS REFERENCE TO RELATED APPLICATION

This application is a non-provisional application claiming the benefit of U.S. Provisional Application Ser. No. 62/110,092, entitled "User Interface for Managing Networked Devices," which was filed on Jan. 30, 2015, and is incorporated herein by reference in its entirety.

TECHNICAL FIELD

This disclosure relates to the management of home network elements.

BACKGROUND

Typically, multiple services (e.g., video, voice, data, etc.) are received at a subscriber premise by a customer premise equipment (CPE) device (e.g., gateway device), and the multiple services are provided to consumers over a local network (e.g., local area network (LAN), wireless local area network (WLAN), multimedia over coax alliance (MoCA) network, etc.). Devices connected to the local network may be configured to receive services offered by a service provider (e.g., multiple systems operator (MSO)) and may be configured to communicate with other devices connected to the local network.

The types of devices that may be connected to a local network continues to grow in number. For example, local network access is not limited to only multimedia devices (e.g., set-top boxes (STB), televisions, mobile devices, tablets, etc.), but is now available to a multitude of other home and personal devices (e.g., Internet of things (IoT) devices) such as appliances, wearables, home automation devices, and others.

However, subscribers are left without a means for viewing the breadth of a local network and the various devices that are accessing or have access to the local network. Moreover, there are currently no mechanisms available to allow a subscriber to view the various connections or pairings that may exist between devices within the subscriber premise. Therefore, it is desirable to provide a user interface through which a subscriber may view, manage, and interact with the plurality of devices connected to a local network.

BRIEF DESCRIPTION OF THE DRAWINGS

Like reference numbers and designations in the various drawings indicate like elements.

DETAILED DESCRIPTION

Figure 1:
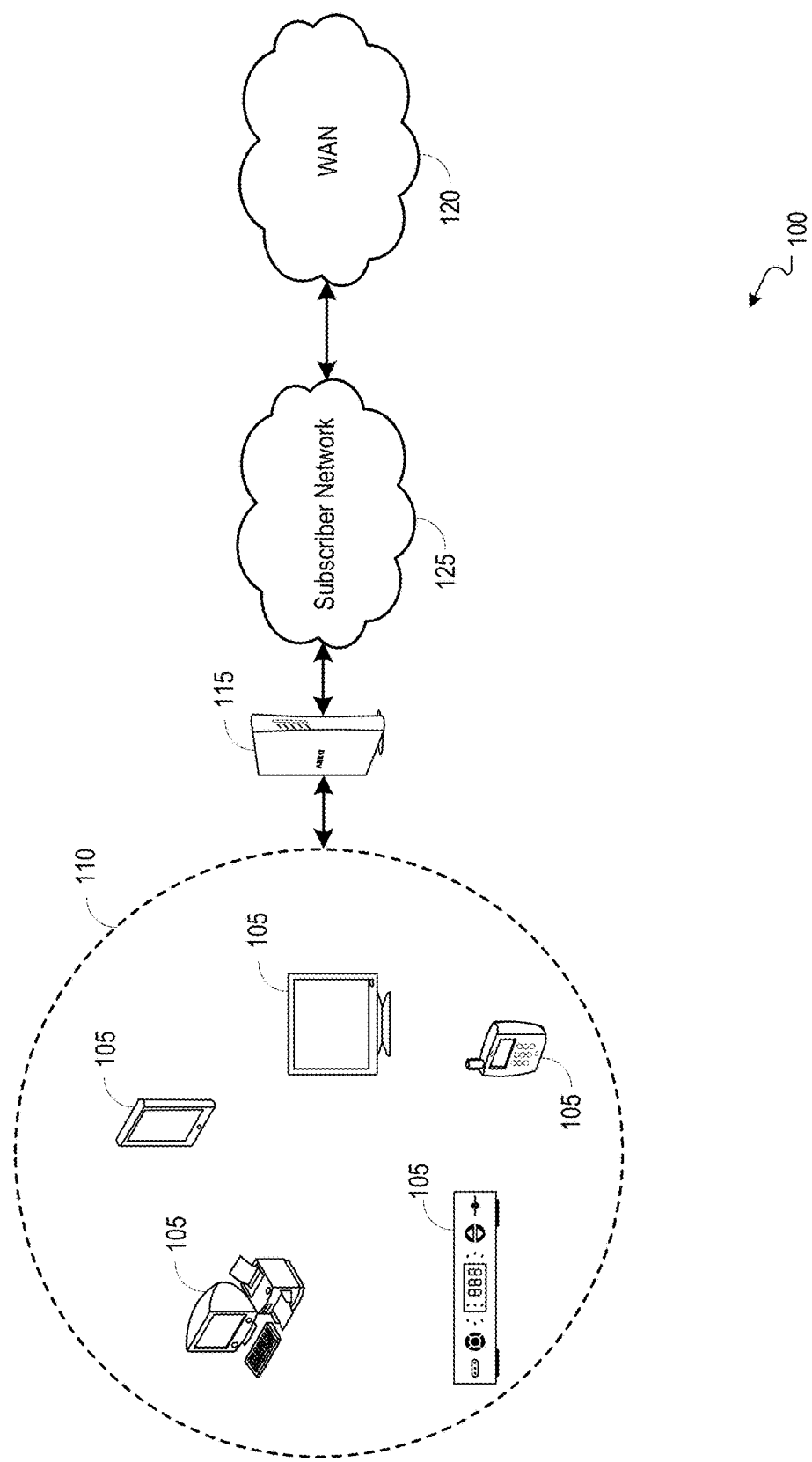
FIG. 1 is a block diagram illustrating an example network environment operable to facilitate the generation of a user interface displaying the devices associated with a local network.

It is desirable to improve upon methods and systems for monitoring, managing, and interfacing with devices associated with a common central device, local network, and/or subscriber. The methods, systems, and computer readable media described herein can be operable to facilitate the generation of a user interface displaying the devices associated with a local network. A client device may retrieve information associated with one or more devices associated with a common central device, local network, and/or subscriber. The client device may generate a user interface including one or more device objects organized along an ellipsoidal wireframe, wherein each device object represents an identified device. The user interface may include device identification and/or status information associated with each displayed device. Devices displayed within the user interface may be filtered based upon one or more parameters selected by a user. The client device may update and rearrange the displayed device objects based upon navigation commands received from a user via a control device.

An embodiment of the invention described herein may include a method comprising: (a) identifying one or more devices of a group of networked devices, wherein each of the one or more devices within the group of networked devices is associated with a common local network; (b) retrieving device information associated with one or more of the one or more identified devices; (c) identifying one or more of the one or more identified devices for displaying within the user interface by filtering the one or more identified devices according to one or more parameters; (d) associating each respective one of the one or more devices identified for displaying within the user interface with a respective device object and a respective location within an ellipsoidal wireframe; and (e) outputting the user interface to a display, wherein the user interface comprises each respective device object positioned at a respective location within the ellipsoidal wireframe.

According to an embodiment of the invention, the method described herein may further comprise the steps of: (a) determining that a respective one of the one or more devices identified for displaying within the user interface is associated with at least one subsidiary device; (b) retrieving information associated with the at least one subsidiary device; (c) associating each respective one of the at least one subsidiary device with a subsidiary device icon; and (d) displaying each subsidiary device icon as an element rotating about a device icon associated with the respective one device.

According to an embodiment of the invention, the method described herein may further comprise the steps of: (a) receiving a user selection of a device object; (b) identifying one or more subsidiary devices that are associated with the device associated with the selected device object; (c) associating each respective one of the one or more subsidiary devices with a respective subsidiary device object and a respective location within a secondary ellipsoidal wireframe; and (d) outputting a secondary user interface to a display, wherein the secondary user interface comprises each respective subsidiary device object positioned at a respective location within the secondary ellipsoidal wireframe.

According to an embodiment of the invention, each respective one of the one or more devices identified for displaying within the user interface is associated with a device icon background color, the device icon background color being based upon a status of the respective device.

According to an embodiment of the invention, the method described herein further comprises the steps of: (a) receiving a navigation command; and (b) rotating the positions of the device icons along the ellipsoidal wireframe in response to a direction indicated by the navigation command, such that a first device object located in a central location along the ellipsoidal wireframe prior to the navigation command being received is replaced in the central location by a second device object that is positioned adjacent to the first object along the ellipsoidal wireframe.

According to an embodiment of the invention, the size of the second device object is increased when the second device object is placed in the central location along the ellipsoidal wireframe.

According to an embodiment of the invention, the method described herein further comprises the steps of: (a) receiving a user selection of a device object; (b) raising the position of the center of the ellipsoidal wireframe within the user interface; and (c) displaying one or more secondary icons associated with the selected device object.

An embodiment of the invention described herein may include an apparatus comprising: (a) one or more modules configured to: (i) identify one or more devices of a group of networked devices, wherein each of the one or more devices within the group of networked devices is associated with a common local network; (ii) retrieve device information associated with one or more of the one or more identified devices; (iii) identify one or more of the one or more identified devices for displaying within a user interface by filtering the one or more identified devices according to one or more parameters; (iv) associate each respective one of the one or more devices identified for displaying within the user interface with a respective device object and a respective location within an ellipsoidal wireframe; and (b) an interface configured to be used to output the user interface to a display, wherein the user interface comprises each respective device object positioned at a respective location within the ellipsoidal wireframe.

An embodiment of the invention described herein may include one or more non-transitory computer readable media having instructions operable to cause one or more processors to perform the operations comprising: (a) identifying one or more devices of a group of networked devices, wherein each of the one or more devices within the group of networked devices is associated with a common local network; (b) retrieving device information associated with one or more of the one or more identified devices; (c) identifying one or more of the one or more identified devices for displaying within the user interface by filtering the one or more identified devices according to one or more parameters; (d) associating each respective one of the one or more devices identified for displaying within the user interface with a respective device object and a respective location within an ellipsoidal wireframe; and (e) outputting the user interface to a display, wherein the user interface comprises each respective device object positioned at a respective location within the ellipsoidal wireframe.

FIG. 1 is a block diagram illustrating an example network environment 100 operable to facilitate the generation of a user interface displaying the devices associated with a local network. In embodiments, video, voice, and/or data services may be delivered to one or more client devices 105. Client devices 105 may include a television, mobile device, tablet, computer, set-top box (STB), gaming device, access points (APs), and any other device operable to receive video, voice, and/or data services. It should be understood that various services may be delivered to the client devices 105, including but not limited to, live or broadcast television, video-on-demand (VoD) content, pay-per view content, recorded content (e.g., DVR content), audio-only content, streaming content such as YouTube or Netflix content, and other various video, data, and/or voice services. It should be further understood that the devices shown in FIG. 1 may be integrated. For example, a television may be connected to and controlled by a STB.

In embodiments, client devices 105 may include Internet of things (IoT) devices. For example, household devices appliances such as refrigerators, temperature control elements, ovens, and any other device within a subscriber premise that may communicate (e.g., over a wired or wireless interface) with one or more other client devices 105 or access point.

Multiple services may be delivered to client devices 105 over a local network 110. The local network 110 may include a local area network (LAN), wireless local area network (WLAN), personal area network (PAN), mobile hotspot network, and others. The local network 110 may be provided at a subscriber premise by a central device 115. The central device 115 may include a gateway device, modem device, combination thereof or other access device. It will be appreciated by those skilled in the relevant art that delivery of the multiple services over the local network 110 may be accomplished using a variety of standards and formats.

In embodiments, one or more client devices 105 associated with a subscriber and/or premise may be referred to as a group of networked devices. For example, a group of networked devices may include each of one or more client devices 105 that are serviced by a common central device 115 or that are otherwise associated with a common local network 110. The group of networked devices may further include any subsidiary device associated with a client device 105 that is service by the common central device 115. For example, subsidiary devices may include devices that are configured to communicate with a client device 105 but that are not configured to communicate with a central device servicing the client device 105. Subsidiary devices may include, but are not limited to printers, scanners, cameras, remote control units (RCUs), projectors, servers, and others.

In embodiments, multiple services (e.g., video, voice, and/or data services) may be delivered from a wide-area network (WAN) 120 to the local network 110 through a connection to a subscriber network 125. The subscriber network 125 may include an optical network, hybrid fiber coaxial (HFC) network, twisted-pair, mobile network, high-speed data network, satellite network, and others. Multiple systems operator (MSO) devices and/or networks within the WAN 120 may be used to provide, manage, and/or troubleshoot the multiple services provided to subscribers.

It will be appreciated by those skilled in the relevant art that client devices 105 may be capable of interacting and communicating with each other and/or with a central device 115 over various wireless communication standards (e.g., Wi-Fi, Zigbee, Bluetooth, etc.) or wired communication standards (e.g., Ethernet, Multimedia over Coax Alliance (MoCA), etc.). Client devices 105 connected to a local network 110 may receive services according to one or more subscriptions entered into between a subscriber and service provider.

In embodiments, a client device 105 (e.g., STB) may be configured to provide a subscriber with an interface for monitoring and/or managing client devices 105 making up a group of networked devices. For example, a subscriber may request the interface through a STB, and the STB may output the interface to a display device (e.g., television) associated with the STB. The subscriber may initiate the generation of the interface and may control and navigate the interface using a control unit (e.g., RCU) associated with the STB.

A STB may be configured to identify each of one or more client devices 105 within a group of networked devices associated with a common central device 115 and/or a subscriber initiating the interface generation. In embodiments, the central device 115 can maintain a list of client devices 105 that are connected to the central device 115, are serviced by the central device 115, and/or are otherwise associated with a common premise, subscription, and/or subscriber. For example, the central device 115 can periodically request connection updates from client devices 105 or can receive a notification when a client device 105 joins the local network 110.

The STB may be configured to retrieve various other information associated with client device(s) 105 making up the group of networked devices. For example, the central device 115 may store or otherwise access information associated with client devices 105 under the control of a subscriber, content provided to the client devices 105, and subscription information associated with the client devices 105. It should be understood that the information identifying content provided to client devices and/or subscription information may be located at a network back office (e.g., server or application connected to the WAN 120), or may be located within a subscriber premise (e.g., server or application connected to the local network 110).

The STB may retrieve status information associated with client device(s) 105 making up the group of networked devices. The central device 115 may maintain and/or access current status information associated with each client device 105 (e.g., power state, tuning state, content displayed, wireless capability/availability, etc.). For example, the central device 115 may periodically request state information and/or tuning/content information from each of the client devices 105 or the central device 115 may receive status updates from a client device when the client device experiences a power state change (e.g., powers up or down) or when the client device tunes to a different channel or content source. It will be appreciated by those skilled in the relevant art that the central device 115 can use various communication techniques and methods to maintain a current list of client devices and corresponding status information.

The STB may retrieve subscription information associated with client device(s) 105 making up the group of networked devices. The central device 115 may maintain subscription information associated with one or more client devices 105 or a subscriber associated with the client devices 105. For example, the central device 115 may have access to subscription information (e.g., internally or through a connection to an external server), and can determine what services and/or programming is available to a client device 105 or subscriber by looking up the corresponding subscription information.

In embodiments, the STB may generate a user interface that displays to a viewer an identifier of each of the client devices 105 making up the group of networked devices. Devices that are connected and networked together may be displayed in a mixed icon/text/background style, wherein the icon/text/background describes or suggests the identity, functionality, and/or status of each of the one or more client devices 105 making up the group of networked devices. Each client device 105 may be displayed in the user interface as an object, and each object can include various components serving to describe the identity, functionality, status, and/or other characteristics of the device. The object may include an icon associated with the type of device (e.g., gateway, set-top box (STB), gaming device, mobile device, etc.). The object may include text describing the type of device, an identifier or name of the device (e.g., a name assigned to the device by a user/owner), a user associated with the device, and/or other characteristics. The object may include a background associated with the status of the device. For example, the background may be colored according to whether the device is active/inactive, connected/disconnected, on/off, wirelessly enabled/disabled, or according to other status information.

The device objects may be organized in the user interface in such a way as to allow a subscriber to view all of the client devices 105 connected to a network (e.g., local network 110) and to navigate through each of the displayed devices. For example, an ellipsoidal wireframe may be used to define locations for display of the device objects (e.g., icon/text/background combinations) in a three-dimensional perspective. The ellipsoidal wireframe may provide a skeleton for icon placement within a user interface and may be in the shape of an ellipse. The wireframe may be provided with a depth aspect such that the ellipse appears in the user interface as an ellipsoid. In embodiments, the ellipsoidal wireframe may be an adjusting wireframe. For example, the wireframe may be rotated according to user interaction with the user interface. A user may navigate the user interface via a RCU associated with the STB, and the user interface may provide the user with options for managing, configuring, and interacting with the client devices 105 represented by the various device objects.

In embodiments, the user interface may include one or more sub-layers. For example, a client device 105 represented by a device object within a primary layer of the user interface may be associated with one or more subsidiary devices (e.g., printers, scanners, cameras, RCUs, projectors, servers, etc.), and when a user selects the device object representing the client device 105, a sub-layer of the user interface including a display of one or more device objects representing the one or more subsidiary devices may be presented to the user.

Figure 2:
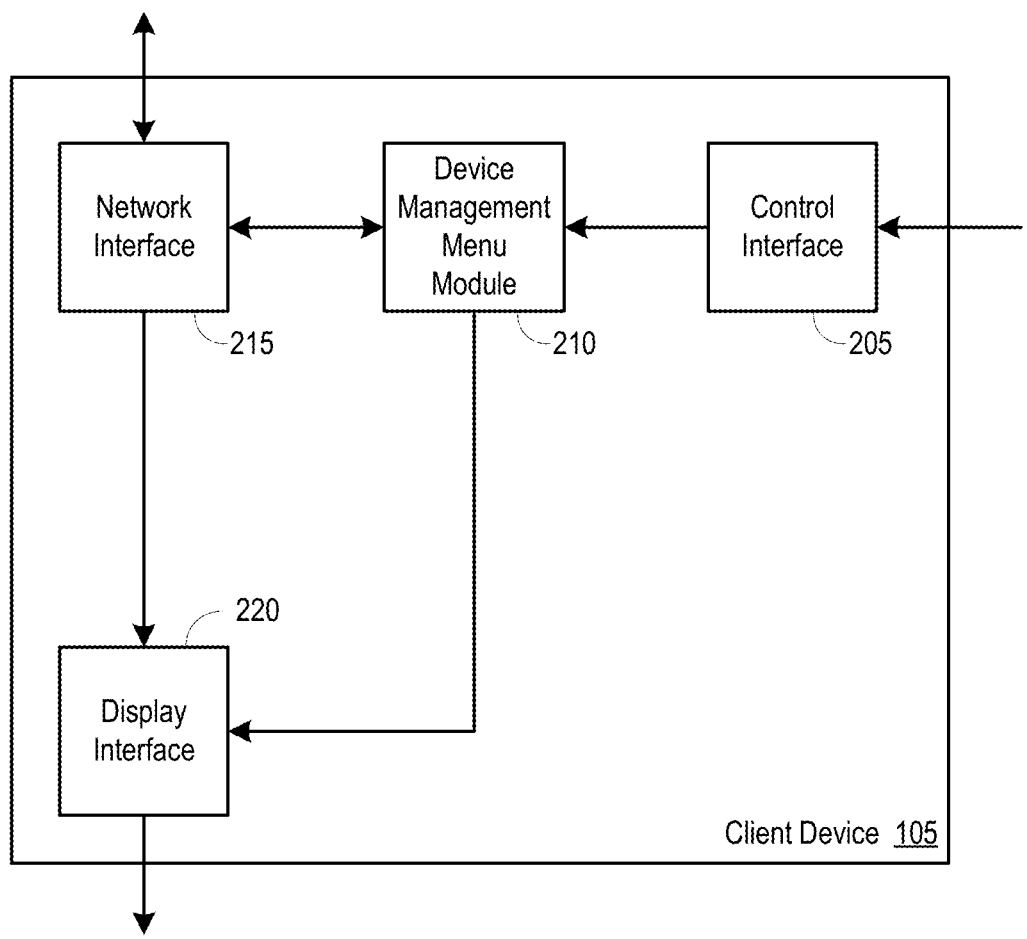
FIG. 2 is a block diagram illustrating an example client device operable to facilitate the generation of a user interface displaying the devices associated with a local network.

FIG. 2 is a block diagram illustrating an example client device 105 operable to facilitate the generation of a user interface displaying the devices associated with a local network. The client device 105 may be a STB, or any other device configured to output a user interface displaying one or more client devices 105 associated with a common central device 115 of FIG. 1 or local network 110 of FIG. 1. The client device 105 may include a control interface 205, a device management menu module 210, a network interface 215, and a display interface 220. In embodiments, the device management menu module 210 may reside within the client device 105, a central device 115, a server or application at another device within a premise or local network, a server or application within an upstream network (e.g., subscriber network 125 of FIG. 1, WAN 120 of FIG. 1, etc.), or any other suitable location.

In embodiments, the client device 105 may be configured to provide a subscriber with an interface for monitoring and/or managing devices making up a group of networked devices. For example, the client device 105 may receive a subscriber request for the interface through a control interface 205, and the client device 105 may output the interface to a display device (e.g., television) through a display interface 220. The subscriber may initiate the generation of the interface and may control and navigate the interface using a control unit (e.g., RCU) associated with the client device 105. For example, the client device 105 may receive initiation and control commands from the control unit through the control interface 205.

When a request for the interface is received at the client device 105, a device management menu module 210 may identify each of one or more devices (e.g., client devices 105, central device 115 of FIG. 1, subsidiary devices, etc.) within a group of networked devices associated with a common central device 115 and/or a subscriber initiating the interface generation. In embodiments, the central device 115 can maintain a list of client devices 105 that are connected to the central device 115, are serviced by the central device 115, and/or are otherwise associated with a common premise, subscription, and/or subscriber. The client device 105 may request and receive information associated with each device within the group of networked devices from the central device 115, or other device or server, through the network interface 215. Information associated with a device may include a unique identifier (e.g., device type, device model number, personalized device name, etc.), status information (e.g., power state, tuning state, content displayed, wireless capability/availability, etc.), and/or other device information.

In embodiments, the device management menu module 210 may generate a user interface that displays to a viewer an identifier of each of the devices making up the group of networked devices. Each device may be displayed in the user interface as an object, and each object can include various components serving to describe the identity, functionality, status, and/or other characteristics of the device. The object may include an icon associated with the type of device (e.g., gateway, set-top box (STB), gaming device, mobile device, etc.). The object may include text describing the type of device, an identifier or name of the device (e.g., a name assigned to the device by a user/owner), a user associated with the device, and/or other characteristics. The object may include a background associated with the status of the device. For example, the background may be colored according to whether the device is active/inactive, connected/disconnected, on/off, wirelessly enabled/disabled, or other status information.

The device management menu module 210 may organize the device objects in the user interface in such a way as to allow a subscriber to view all of the devices connected to a network (e.g., local network 110 of FIG. 1) and to navigate through each of the displayed devices. For example, an ellipsoidal wireframe may be used to define locations for display of the device objects (e.g., icon/text/background combinations) in a three-dimensional perspective. The user interface may provide the user with options for managing, configuring, and interacting with the devices represented by the various device objects.

In embodiments, the device management menu module 210 may retrieve information associated with one or more subsidiary devices associated with one or more of the networked devices, and the device management menu module 210 may generate one or more sub-layers associated with the user interface. For example, a device represented by a device object within a primary layer of the user interface may be associated with one or more subsidiary devices (e.g., printers, scanners, cameras, RCUs, projectors, servers, etc.), and when a user selects the device object representing the primary device, a sub-layer of the user interface including a display of one or more device objects representing the one or more subsidiary devices may be output to a display device through the display interface 220.

Figure 3:
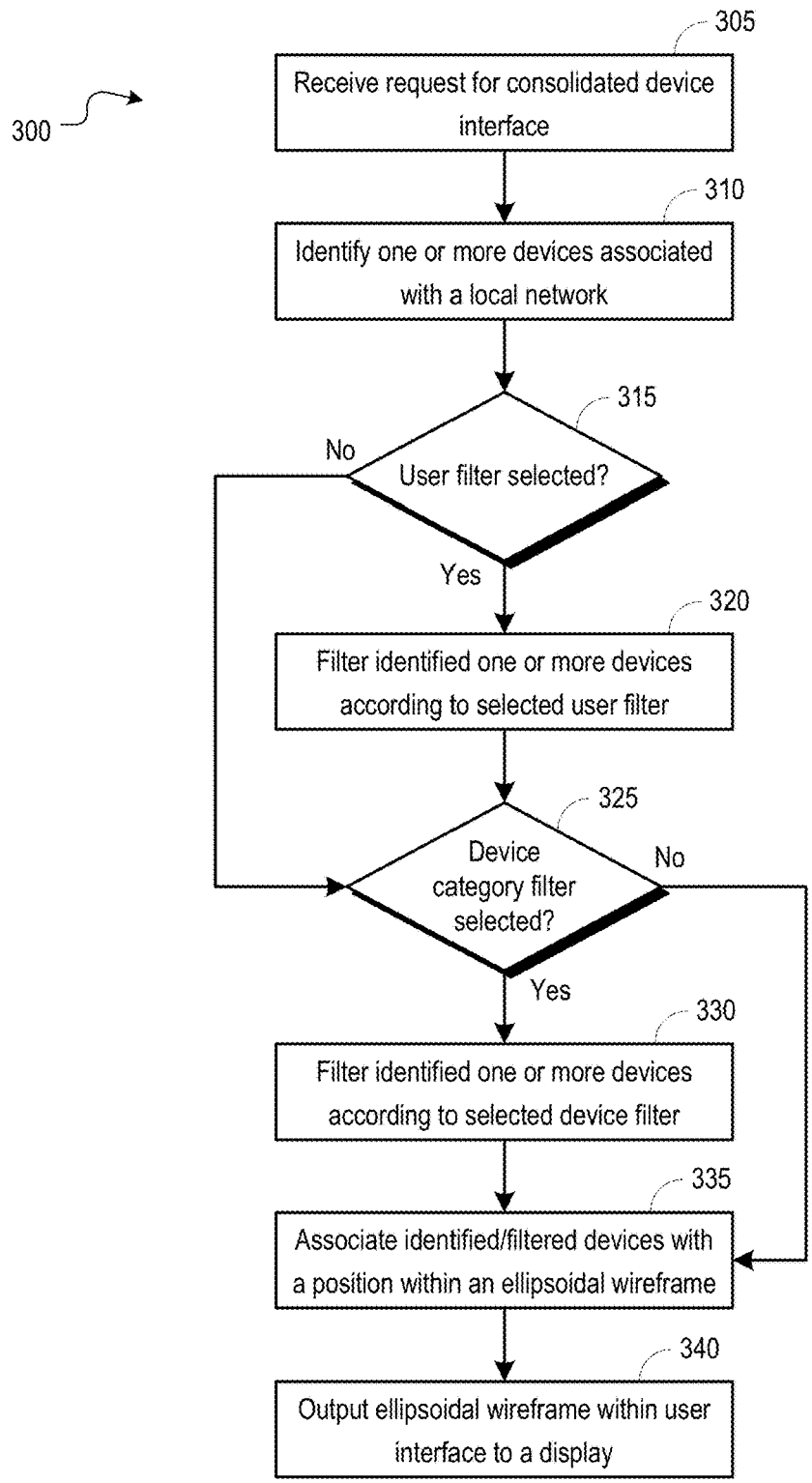
FIG. 3 is a flowchart illustrating an example process operable to facilitate the generation of a user interface displaying the devices associated with a local network.

FIG. 3 is a flowchart illustrating an example process 300 operable to facilitate the generation of a user interface displaying the devices associated with a local network. The process 300 can begin at 305, when a request for a consolidated device interface is received. The request for the consolidated device interface may be received at a client device 105 of FIG. 1 such as a STB.

At 310, one or more devices (e.g., central device 115 of FIG. 1, client devices 105, subsidiary devices, etc.) that are within a group of networked devices may be identified. The one or more devices within a group of networked devices may be identified, for example, by a STB receiving the request for the consolidated device interface. In embodiments, the group of networked devices may include one or more client devices 105 connected to and/or serviced by one or more associated central devices 115, one or more client devices 105 connected to a common network (e.g., local network 110 of FIG. 1), and/or one or more client devices 105 associated with a common subscription, subscriber, and/or premise. Associations between client devices 105, central devices 115, local networks 110, and subscription services may be stored at and retrieved from a central device 115 serving the STB. It should be understood that the associations between client devices 105, central devices 115, local networks 110, and subscription services may be stored at and retrieved from various other devices (e.g., CPE devices, client devices, etc.) and/or servers (e.g., upstream network servers, servers internal to a subscriber premise, etc.).

At 315, the determination may be made whether a user filter is selected for application to the one or more identified devices. The determination whether a user filter is selected may be made, for example, by a device management menu module 210 of FIG. 2. In embodiments, a specific user associated with the request for the consolidated device interface may be identified. For example, the specific user may be identified from the request for the consolidated device interface, may be determined based upon a default setting at the STB, or may be determined based upon input received from the user.

If, at 315, the determination is made that a user filter is selected, the process 300 may proceed to 320. At 320, the one or more identified devices may be filtered according to the selected user filter. In embodiments, the STB (e.g., at a device management menu module 210) may maintain a list of identified devices making up a group of networked devices, and one or more of the identified devices may be associated with one or more specific users. The STB may remove from the list of identified devices any device that is not associated with the user identified by the selected user filter.

If, at 315, the determination is made that no user filter is selected, the process 300 may proceed to 325. At 325, the determination may be made whether a device category filter is selected for application to the one or more identified devices. The determination whether a device category filter is selected may be made, for example, by a device management menu module 210 of FIG. 2. In embodiments, each of the identified client devices 105 may be associated with one or more categories (e.g., device type, wireless capability, service type, etc.), and a specific category may be selected by a user for use in populating a list of client devices 105. A category selection may be identified from the request for the consolidated device interface, may be determined based upon a default setting at the STB, or may be determined based upon input received from the user.

If, at 325, the determination is made that a device category filter is selected, the process 300 may proceed to 330. At 330, the one or more identified devices may be filtered according to the selected device category filter. In embodiments, the STB (e.g., at a device management menu module 210) may maintain a list of identified devices making up a group of networked devices, and one or more of the identified devices may be associated with one or more categories. The STB may remove from the list of identified devices any device that is not associated with the category identified by the selected device category filter.

If, at 325, the determination is made that a device category filter is not selected, the process 300 may proceed to 335. At 335, each of the identified devices, or identified devices that remain after filtering according to a selected user filter and/or device category filter, may be associated with a position within an ellipsoidal wireframe. The identified devices may be associated with ellipsoidal wireframe positions, for example, by the device management menu module 210. In embodiments, each of the identified devices may be associated with an icon (e.g., a display icon indicating a device type such as television, tablet, access point, computer, IoT device, etc.), and the device management menu module 210 may generate a user interface (e.g., graphical user interface (GUI)) that includes the one or more icons radially positioned along an ellipsoidal wireframe. The user interface may further include an identification of and an option for changing a selected user filter, device category filter, and various other information and filter settings associated with the user interface. The ellipsoidal wireframe may be output within the user interface to a display (e.g., display device such as a television connected to the STB) at 340.

Figure 4:
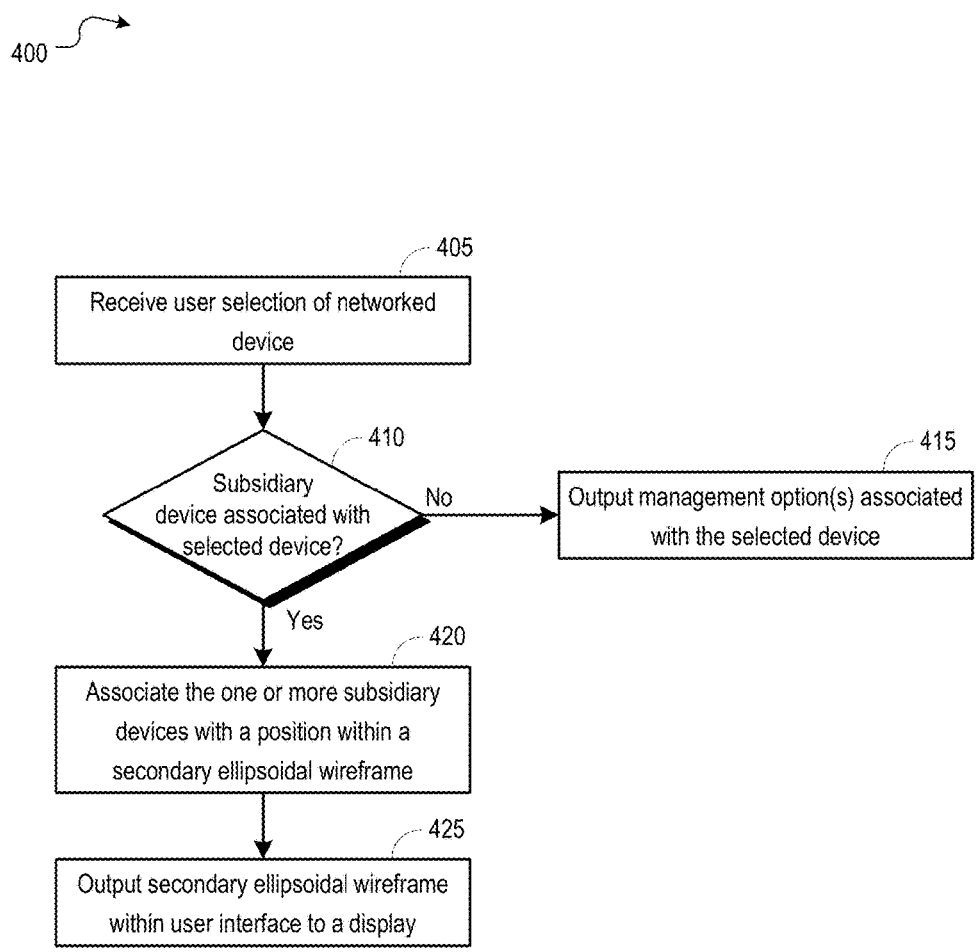
FIG. 4 is a flowchart illustrating an example process operable to facilitate the generation of a user interface displaying subsidiary devices associated with a selected client device.

FIG. 4 is a flowchart illustrating an example process 400 operable to facilitate the generation of a user interface displaying subsidiary devices associated with a selected client device. The process 400 can begin at 405, when a user selection of a networked device (e.g., client device 105 of FIG. 1) is received. The user selection of a networked device may be received at a client device 105 of FIG. 1 such as a STB. In embodiments, the selection of the networked device may be a selection of an icon associated with the networked device from an ellipsoidal wireframe displayed within a user interface that is output from the STB to a display.

At 410, the determination may be made whether one or more subsidiary devices are associated with the selected device. An association between the selected device and one or more subsidiary devices may be indicated to a user by displaying one or more icons associated with the one or more subsidiary devices surrounding the icon representing the selected device in the user interface. The STB, or another client device 105 or central device 115 of FIG. 1 may maintain associations between a networked device and subsidiary device(s). For example, the determination whether one or more subsidiary devices are associated with the selected device may be made by the device management menu module 210 of FIG. 2.

If, at 410, the determination is made that no subsidiary devices are associated with the selected device, the process 400 may proceed to 415. At 415, one or more management options associated with the selected device may be output to a display within a user interface. For example, the STB may output an interface that includes one or more user selectable options for viewing device details associated with the selected device, configuring the selected device (e.g., power up/down, configuring wireless settings, etc.), or otherwise interacting with the selected device.

If, at 410, the determination is made that at least one subsidiary device is associated with the selected device, the process 400 may proceed to 420. At 420, each of the one or more subsidiary devices may be associated with a position within a secondary ellipsoidal wireframe. The one or more subsidiary devices may be associated with ellipsoidal wireframe positions, for example, by the device management menu module 210. In embodiments, each of the one or more subsidiary devices may be associated with an icon (e.g., a display icon indicating a device type such as printer, scanner, camera, RCU, etc.), and the device management menu module 210 may generate a user interface (e.g., graphical user interface (GUI)) that includes the one or more icons radially positioned along a secondary ellipsoidal wireframe. The secondary ellipsoidal wireframe may be output within the user interface to a display (e.g., display device such as a television connected to the STB) at 425.

Figure 5:
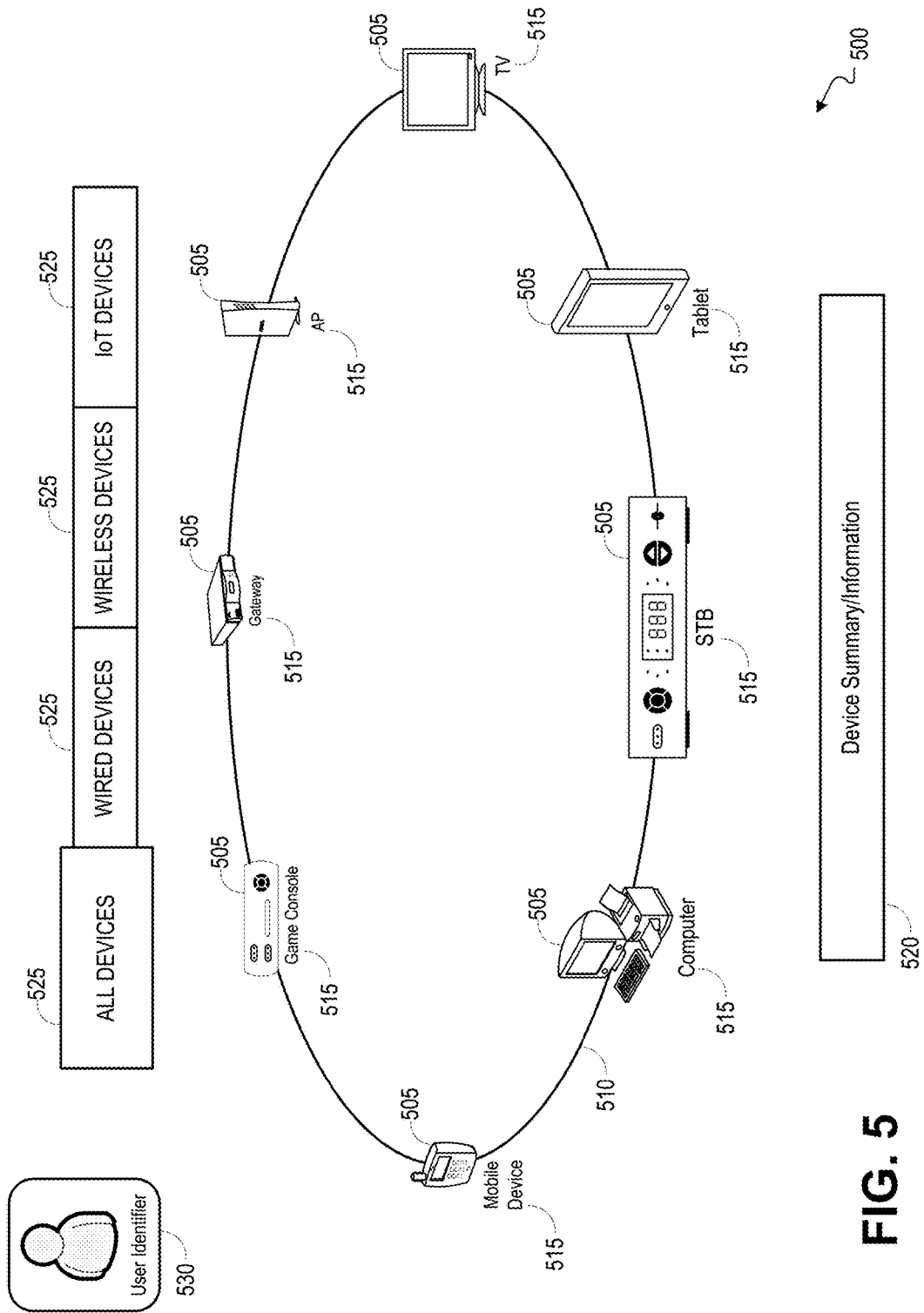
FIG. 5 is an illustration of an example user interface operable to facilitate the display of devices associated with a local network.

FIG. 5 is an illustration of an example user interface 500 operable to facilitate the display of devices associated with a local network. The user interface 500 may be generated by a client device (e.g., client device 105 of FIG. 1 such as a STB), a central device 115 of FIG. 1 (e.g., gateway device), an upstream network device (e.g., external server, or any other device. In embodiments, the user interface 500 may be output from a STB and displayed at a display device (e.g., television, tablet, mobile device, etc.) associated with the STB. It will be appreciated by those skilled in the relevant art that the user interface 500 may be displayed to a subscriber using various interface types (e.g., graphical user interface (GUI), touch-screen interface, etc.).

In embodiments, one or more device icons 505 representing devices that are connected and/or networked together may be displayed along an ellipsoidal wireframe 510 in the user interface 500. The devices represented by device icons 505 in the user interface 500 may include each of one or more client devices 105, central device 115, and/or subsidiary devices making up a group of networked devices (e.g., devices connected to a common central device 115 and/or common local network 110 of FIG. 1).

In embodiments, the device icon 505 may be an image that describes or suggests the device identity, functionality, and/or status. For example, each device icon 505 may be an icon associated with the type of device (e.g., gateway, set-top box (STB), gaming device, mobile device, etc.) that is represented by the device icon 505. In embodiments, each device icon 505 may be associated with a textual identifier 515, wherein the textual identifier 515 describes a device type associated with the device represented by the device icon 505, a name of the device (e.g., a name assigned to the device by a user/owner), a user associated with the device, or other characteristic(s).

In embodiments, the device icon 505 may include a background associated with the status of the device represented by the device icon 505. For example, the background may be colored according to whether the device is active/inactive, connected/disconnected, on/off, or according to other status or configuration information. As another example, the device icon 505 may include a symbol designated to indicate when the device represented by the device icon 505 is capable of receiving and/or transmitting wireless communications (e.g., Wi-Fi symbols) and whether or not the device is successfully paired with another device via a wireless connection (e.g., Wi-Fi connection, Bluetooth connection, etc.).

The device icons 505 may be radially spread along the ellipsoidal wireframe 510. For example, locations along the ellipsoidal wireframe 510 may be designated for the display of the device icons 505 in a three-dimensional perspective. A three-dimensional perspective may be created by reducing the size of device icons 505 and corresponding textual identifiers 515 as the device icons 505 and textual identifiers 515 are moved from the bottom of the user interface 500 toward the top of the user interface 500. For example, the front (i.e., bottom) device icon 505 may be the largest device icon 505, and the back (i.e., top) device icon 505 may be the smallest device icon 505.

In embodiments, a user may navigate through the device icons 505 by rotating the positions of the displayed device icons 505 around the ellipsoidal wireframe 510. For example, a user may navigate through the device icons 505 using a RCU that interfaces with a STB through which the user interface 500 is output. Navigation to the right or to the left moves all device icons 505 one location along the ellipsoid border to the left or right respectively, and brings the next, adjacent device icon 505 to the front/center of the user interface 500. Each time the ellipsoid is rotated to account for a navigation step, the size of all device icons 505 may be changed to maintain the three-dimensional perspective on the user interface 500.

In embodiments, the device icon 505 in the front/center location along the ellipsoidal wireframe 510 (e.g., the position of the "STB" as shown in FIG. 5) may be designated as the subject device. For example, a user may initiate a further inspection, configuration, or other interaction with the subject device by pressing a pre-defined button (e.g., select, enter, etc.) of a control device associated with the device through which the user interface 500 is displayed. In embodiments, various properties of the subject device icon 505 may be emphasized over other device icons 505. For example, the subject device icon 505 may be larger than the other device icons 505, may be colored differently or brighter than the other device icons 505, or other properties may be emphasized. In embodiments, an indentation or arrow on the line creating the ellipsoidal wireframe 510 border may be positioned below the subject device icon 505 and may point to the subject device icon 505.

In embodiments, device and configuration information associated with a device represented by a device icon 505 may be displayed within a device summary/information text box 520 of the user interface 500. For example, device and configuration information associated with a subject device icon 505 may be displayed after the subject device icon 505 has been positioned at the front of the ellipsoidal adjusting wireframe 510 for a predetermined duration of time (e.g., 1 second, 2 seconds, etc.) or may be displayed after a user initiates a request (e.g., via a request received from a RCU) for the device and/or configuration information associated with the subject device icon 505. In embodiments, text describing what functions are available to the user, what specific RCU keys may be used to activate certain functions, instructions for navigating the user interface 500, and other information may be displayed to a user within the device summary/information text box 520.

When a device icon 505 located in the forward-most position of the ellipsoidal adjusting wireframe 510 (e.g., the subject device icon 505) is selected for configuration and/or retrieval of additional device information, the entire ellipsoidal adjusting wireframe 510, along with each of the device icons 505 may be raised or shifted up in the user interface 500 to make room for the display of additional secondary icons (e.g., icons linking to categories of additional device configuration or information) and/or device information at the position of the device summary information 520.

In embodiments, the devices included in the interface may be filtered according to various categories (e.g., "All Devices," "Wired Devices," "Wireless Devices," "IoT Devices," etc.). For example, the user interface 500 may include device category filters 525, and a user may select a device category filter to apply to the devices that are organized along the ellipsoidal wireframe 510. A device category filter 525 that is selected by a user may be emphasized over the other device category filters 525. For example, the selected device category filter 525 (e.g., "ALL DEVICES" is the selected device category filter 525 in FIG. 5) may be colored or sized differently than the other device category filters 525 or may be given a different size or color border than the others. When, the selected device category filter 525 is changed, the device icons 505 included on the ellipsoidal wireframe 510 may be updated to include only those device icons 505 that represent devices that are included within the selected device category filter 525.

In embodiments, the devices included in the user interface 500 may be filtered according to a user filter. For example, the user interface 500 may include an identification of a current user and an option to change the current user (e.g., user identifier 530). The device icons 505 located around the ellipsoidal wireframe 510 may include only those device icons 505 that represent devices that are associated with the selected user as identified by the user identifier 530.

Figure 6:
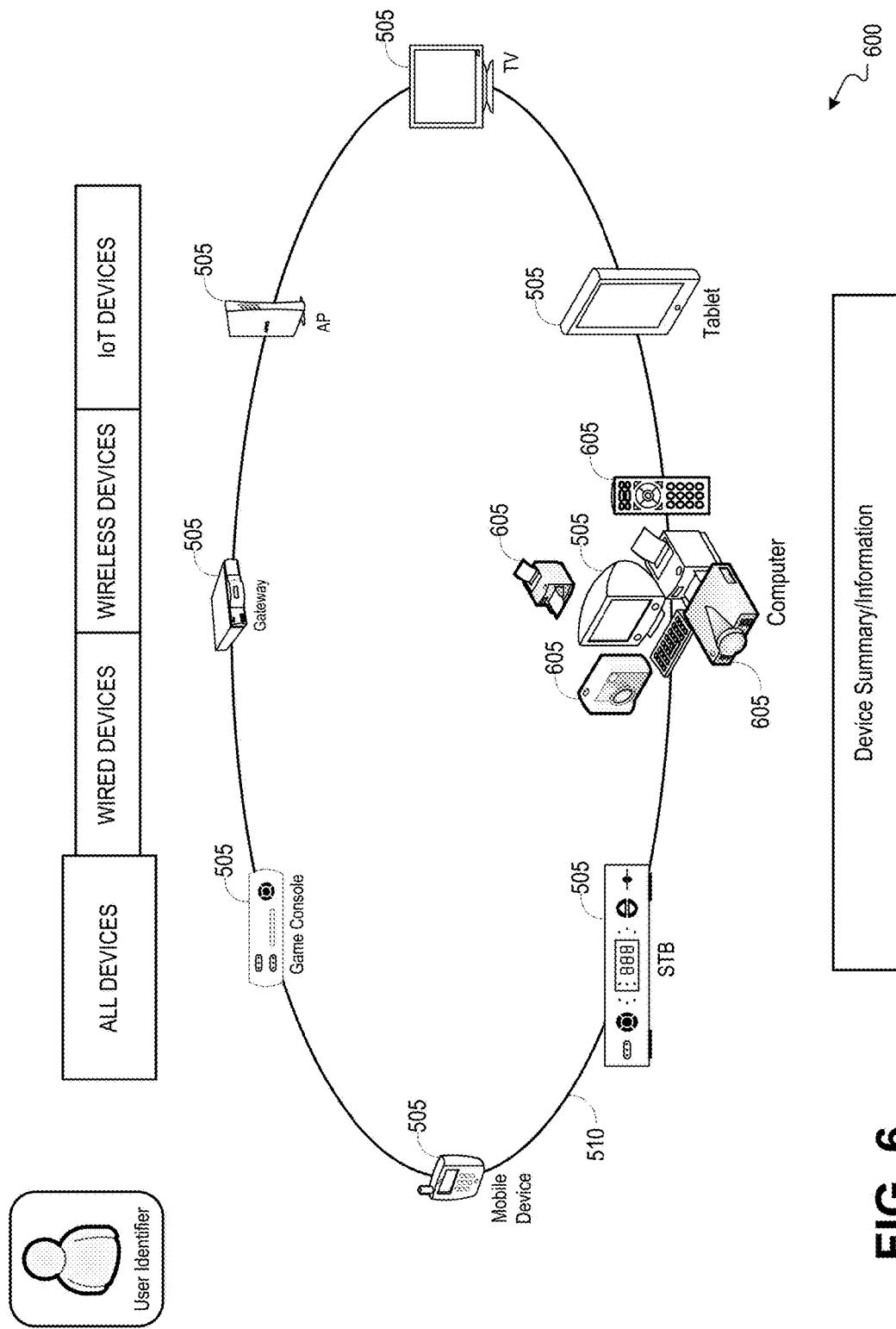
FIG. 6 is an illustration of an example user interface operable to facilitate the display of subsidiary devices associated with a networked device.

FIG. 6 is an illustration of an example user interface 600 operable to facilitate the display of subsidiary devices associated with a networked device. In embodiments, the user interface 600 may include one or more subsidiary device icons 605 representing a subsidiary device (e.g., a device connected to a network solely via another device) that is associated with a device represented by a device icon 505 that is positioned on an ellipsoidal wireframe 510. One or more subsidiary device icons 605 may be displayed within the user interface 600 as a cluster of icons orbiting around the device icon 505 representing the networked device with which the subsidiary devices are associated (e.g., the device through which the subsidiary device is connected to the network). In embodiments, an orbit of subsidiary device icons 605 may be expanded into a full ellipse upon being selected for further examination and collapsed back upon deselection. As an example, subsidiary device icons 605 representing Internet of things (IoT) devices may be shown orbiting an associated networked device. Information associated with subsidiary devices may be retrieved from the networked device (e.g., client device 105 of FIG. 1) with which the subsidiary devices are associated or from a central device (e.g., central device 115 of FIG. 1).

Figure 7:
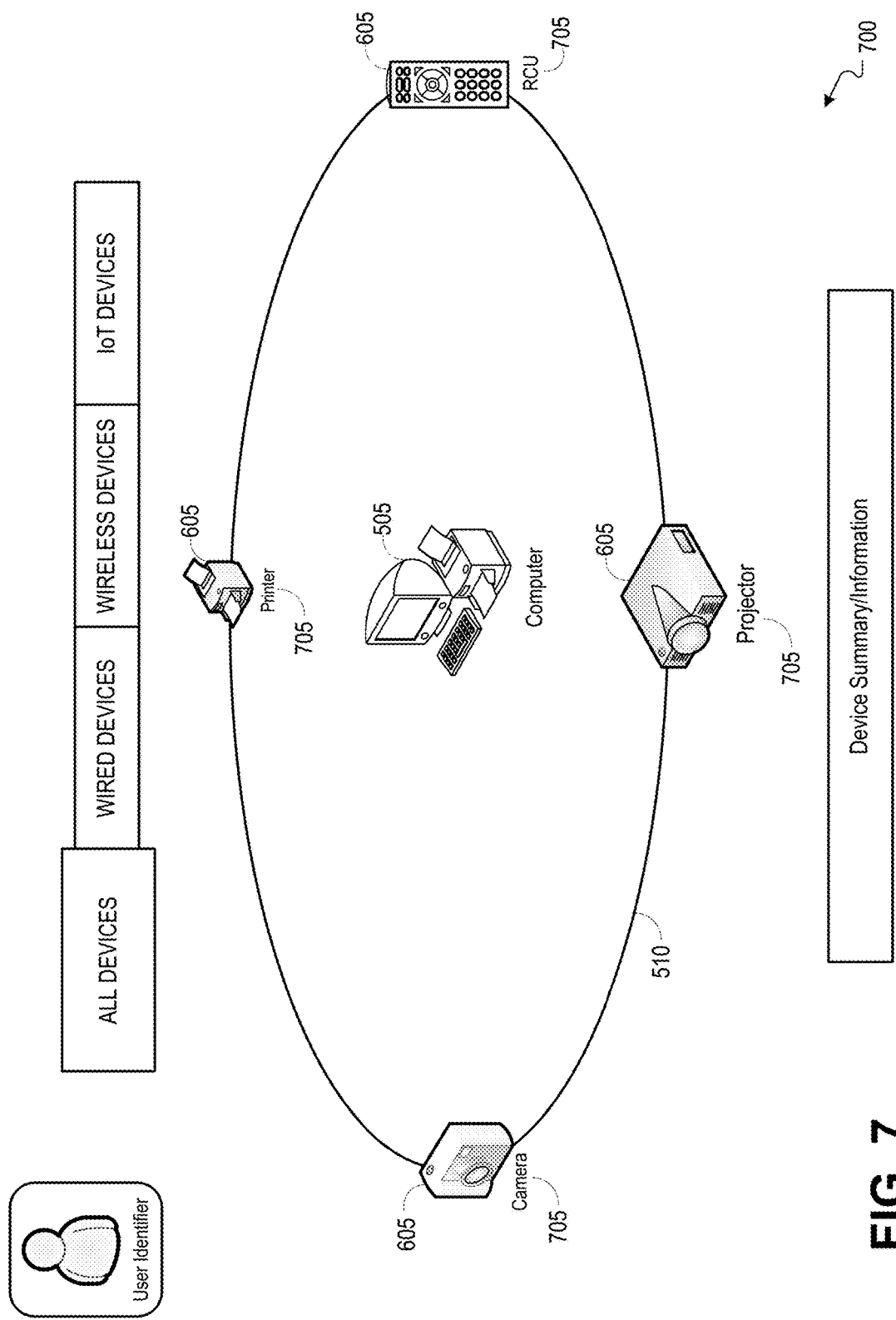
FIG. 7 is an illustration of an example user interface operable to facilitate the expanded display of subsidiary devices associated with a networked device.

FIG. 7 is an illustration of an example user interface 700 operable to facilitate the expanded display of subsidiary devices associated with a networked device. Subsidiary device icons 605 representing subsidiary devices that are associated with a networked device may be spread along an ellipsoidal wireframe 510. A textual identifier 705 may provide an identification of a subsidiary device (e.g., device type, unique name given to the device, etc.). In embodiments, a device icon 505 representing the networked device may be displayed within the center of the ellipsoidal wireframe 510.

Figure 8:
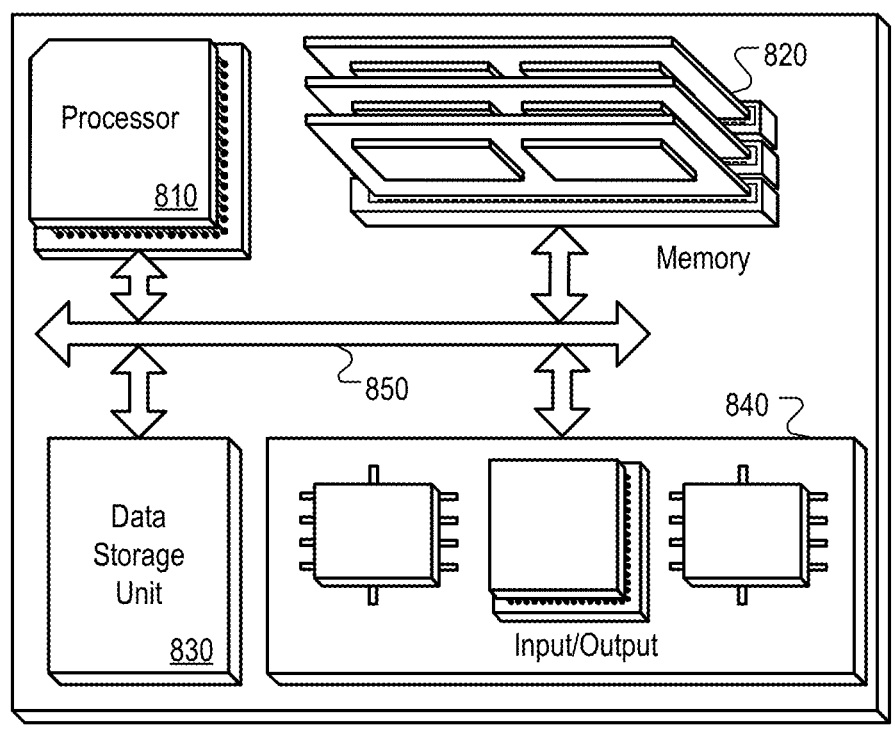
FIG. 8 is a block diagram of a hardware configuration operable to facilitate the generation of a user interface displaying the devices associated with a local network.

FIG. 8 is a block diagram of a hardware configuration 800 operable to facilitate the generation of a user interface displaying the devices associated with a local network. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In embodiments, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, computer, tablet, mobile device, etc.) or central device 115 of FIG. 1 (e.g., gateway device, cable modem, server, etc.). In embodiments, the input/output device can include driver devices configured to send communications to, and receive communications from one or more networks (e.g., local network 110 of FIG. 1, subscriber network 125 of FIG. 1, WAN 120 of FIG. 1, etc.).

Those skilled in the art will appreciate that the invention improves upon methods and systems for monitoring, managing, and interfacing with devices associated with a common central device, local network, and/or subscriber. Methods, systems, and computer readable media can be operable to facilitate the generation of a user interface displaying the devices associated with a local network. A client device may retrieve information associated with one or more devices associated with a common central device, local network, and/or subscriber. The client device may generate a user interface including one or more device objects organized along an ellipsoidal wireframe, wherein each device object represents an identified device. The user interface may include device identification and/or status information associated with each displayed device. Devices displayed within the user interface may be filtered based upon one or more parameters selected by a user. The client device may update and rearrange the displayed device objects based upon navigation commands received from a user via a control device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method of generating a user interface, the method comprising:
   identifying one or more devices of a group of networked devices, wherein each of the one or more devices within the group of networked devices is associated with a common local network;
   retrieving device information associated with one or more of the one or more identified devices;
   identifying one or more of the one or more identified devices for displaying within the user interface by filtering the one or more identified devices according to one or more parameters;
   associating each respective one of the one or more devices identified for displaying within the user interface with a respective device object and a respective location within an ellipsoidal wireframe;
   determining that a respective one of the one or more devices identified for displaying within the user interface is associated with at least one subsidiary device;
   retrieving information associated with the at least one subsidiary device;
   associating each respective one of the at least one subsidiary device with a subsidiary device icon; and
   outputting the user interface to a display, wherein the user interface comprises each respective device object positioned at a respective location within the ellipsoidal wireframe, and wherein the user interface comprises a dynamic display of each respective one subsidiary device icon as an element rotating about a device icon that is associated with a device which is associated with the subsidiary device associated with the respective one subsidiary device icon.

2. The method of claim 1, further comprising:
   receiving a user selection of a device object;
   identifying one or more subsidiary devices that are associated with the device associated with the selected device object;
   associating each respective one of the one or more subsidiary devices with a respective subsidiary device object and a respective location within a secondary ellipsoidal wireframe; and
   outputting a secondary user interface to a display, wherein the secondary user interface comprises each respective subsidiary device object positioned at a respective location within the secondary ellipsoidal wireframe.

3. The method of claim 1, wherein each respective one of the one or more devices identified for displaying within the user interface is associated with a device icon background color, the device icon background color being based upon a status of the respective device.

4. The method of claim 1, further comprising:
   receiving a navigation command; and
   rotating the positions of the device icons along the ellipsoidal wireframe in response to a direction indicated by the navigation command, such that a first device object located in a central location along the ellipsoidal wireframe prior to the navigation command being received is replaced in the central location by a second device object that is positioned adjacent to the first object along the ellipsoidal wireframe.

5. The method of claim 4, wherein the size of the second device object is increased when the second device object is placed in the central location along the ellipsoidal wireframe.

6. The method of claim 1, further comprising:
   receiving a user selection of a device object;
   raising the position of the center of the ellipsoidal wireframe within the user interface; and
   displaying one or more secondary icons associated with the selected device object.

7. An apparatus comprising:
   one or more modules configured to:
   identify one or more devices of a group of networked devices, wherein each of the one or more devices within the group of networked devices is associated with a common local network;
   retrieve device information associated with one or more of the one or more identified devices;
   identify one or more of the one or more identified devices for displaying within a user interface by filtering the one or more identified devices according to one or more parameters;
   associate each respective one of the one or more devices identified for displaying within the user interface with a respective device object and a respective location within an ellipsoidal wireframe;
   determine that a respective one of the one or more devices identified for displaying within the user interface is associated with at least one subsidiary device;
   retrieve information associated with the at least one subsidiary device;
   associate each respective one of the at least one subsidiary device with a subsidiary device icon;
   an interface configured to be used to output the user interface to a display, wherein the user interface comprises each respective device object positioned at a respective location within the ellipsoidal wireframe, and wherein the user interface comprises a dynamic display of each respective one subsidiary device icon as an element rotating about a device icon that is associated with a device which is associated with the subsidiary device associated with the respective one subsidiary device icon.

8. The apparatus of claim 7, wherein the one or more modules are further configured to:
when a device object is selected, identify one or more subsidiary devices that are associated with the device associated with the selected device object;
associate each respective one of the one or more subsidiary devices with a respective subsidiary device object and a respective location within a secondary ellipsoidal wireframe; and
cause the interface to output a secondary user interface to a display, wherein the secondary user interface comprises each respective subsidiary device object positioned at a respective location within the secondary ellipsoidal wireframe.

9. The apparatus of claim 7, wherein each respective one of the one or more devices identified for displaying within the user interface is associated with a device icon background color, the device icon background color being based upon a status of the respective device.

10. The apparatus of claim 7, wherein the one or more modules are further configured to rotate the positions of the device icons along the ellipsoidal wireframe in response to a direction indicated by a received navigation command, such that a first device object located in a central location along the ellipsoidal wireframe prior to the navigation command being received is replaced in the central location by a second device object that is positioned adjacent to the first object along the ellipsoidal wireframe.

11. The apparatus of claim 7, wherein the one or more modules are further configured to:
when a user selection of a device object is received, raise the position of the center of the ellipsoidal wireframe within the user interface; and
cause the interface to output, within the user interface, a display of one or more secondary icons associated with the selected device object.

12. One or more non-transitory computer readable media having instructions operable to cause one or more processors to perform the operations comprising:
identifying one or more devices of a group of networked devices, wherein each of the one or more devices within the group of networked devices is associated with a common local network;
retrieving device information associated with one or more of the one or more identified devices;
identifying one or more of the one or more identified devices for displaying within the user interface by filtering the one or more identified devices according to one or more parameters;
associating each respective one of the one or more devices identified for displaying within the user interface with a respective device object and a respective location within an ellipsoidal wireframe;
determining that a respective one of the one or more devices identified for displaying within the user interface is associated with at least one subsidiary device;
retrieving information associated with the at least one subsidiary device;
associating each respective one of the at least one subsidiary device with a subsidiary device icon; and
outputting the user interface to a display, wherein the user interface comprises each respective device object positioned at a respective location within the ellipsoidal wireframe, and wherein the user interface comprises a dynamic display of each respective one subsidiary device icon as an element rotating about a device icon that is associated with a device which is associated with the subsidiary device associated with the respective one subsidiary device icon.

13. The one or more non-transitory computer-readable media of claim 12, wherein the instructions are further operable to cause the one or more processors to perform the operations comprising:
receiving a user selection of a device object;
identifying one or more subsidiary devices that are associated with the device associated with the selected device object;
associating each respective one of the one or more subsidiary devices with a respective subsidiary device object and a respective location within a secondary ellipsoidal wireframe; and
outputting a secondary user interface to a display, wherein the secondary user interface comprises each respective subsidiary device object positioned at a respective location within the secondary ellipsoidal wireframe.

14. The one or more non-transitory computer-readable media of claim 12, wherein each respective one of the one or more devices identified for displaying within the user interface is associated with a device icon background color, the device icon background color being based upon a status of the respective device.

15. The one or more non-transitory computer-readable media of claim 12, wherein the instructions are further operable to cause the one or more processors to perform the operations comprising:
receiving a navigation command; and
rotating the positions of the device icons along the ellipsoidal wireframe in response to a direction indicated by the navigation command, such that a first device object located in a central location along the ellipsoidal wireframe prior to the navigation command being received is replaced in the central location by a second device object that is positioned adjacent to the first object along the ellipsoidal wireframe.

16. The one or more non-transitory computer-readable media of claim 15, wherein the size of the second device object is increased when the second device object is placed in the central location along the ellipsoidal wireframe.

17. The one or more non-transitory computer-readable media of claim 12, wherein the instructions are further operable to cause the one or more processors to perform the operations comprising:
receiving a user selection of a device object;
raising the position of the center of the ellipsoidal wireframe within the user interface; and
displaying one or more secondary icons associated with the selected device object.

* * * * *